June 10, 1941.  G. L. SLOCUM  2,245,534
AUTOMATIC STOP FOR PIPE LINES
Filed Oct. 10, 1939
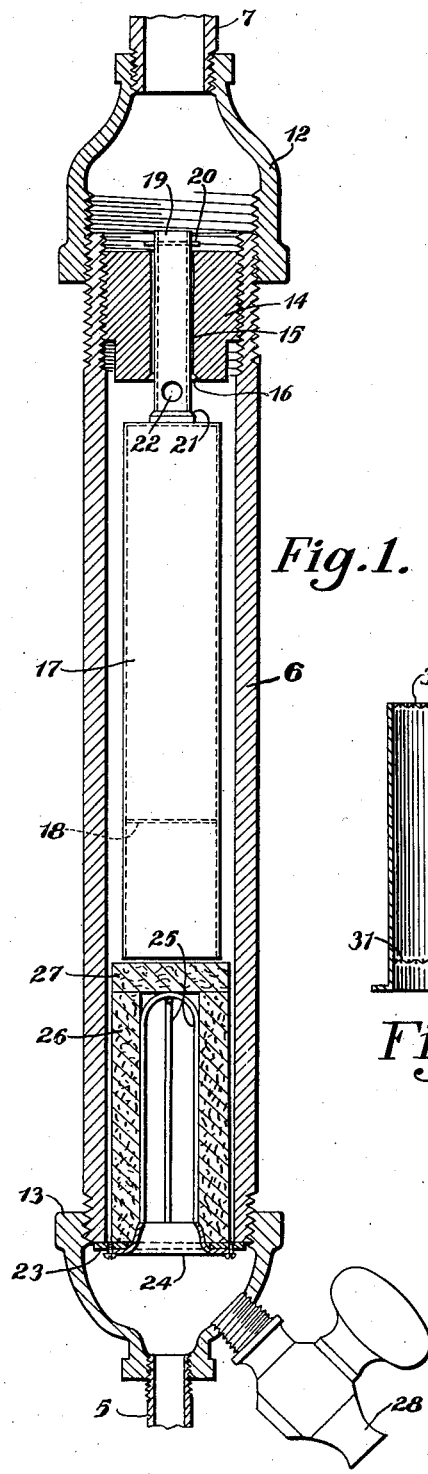
Fig.1.
Fig.3
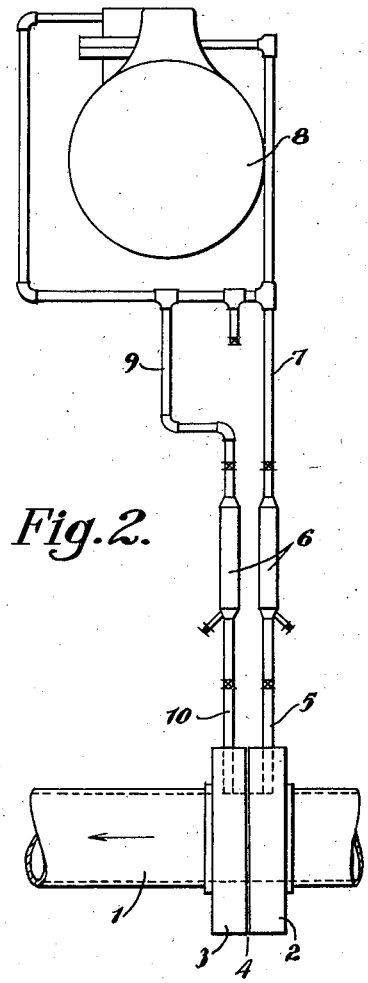
Fig.2.
Inventor
Glen L. Slocum.
By Kenway & Witter
Attorney Patented June 10, 1941

2,245,534

UNITED STATES PATENT OFFICE 2,245,534

AUTOMATIC STOP FOR PIPE LINES

Glen L. Slocum, Pampa, Tex., assignor of one-half to Reno Stinson, Pampa, Tex.

Application October 10, 1939, Serial No. 298,801

1 Claim. (Cl. 137—104)

This invention relates to protecting devices for flow meters or other instruments used in pipe lines for gas, particularly in pipes leading from flowing oil or gas wells where it is desired to install a meter in communication with the gas line at any point such as between the flow tank or separator and the casing head of the well.

More particularly my invention consists in an improved stop or trap acting to prevent oil or other liquid from reaching the meter and so to prevent loss of mercury from the meter or its dilution by liquid from the pipe line. In general my invention contemplates an improved construction of automatic stop or trap adapted to be constructed at low cost and to employ in its structure standard pipe and fittings and which shall be sensitive and reliable in action and thus effective completely to safeguard the meter which it is intended to protect.

In a preferred embodiment, the stop of my invention may comprise an outer casing of standard pipe, an inserted plug having a combined conduit and guide passage therein, and a float member movable in the casing and having a stem guided in the passage, and a valve member arranged to meet the valve seat in limiting the upward movement of the float.

Another feature of my invention, which is optional although very desirable, consists in a filter removably mounted in the lower part of the casing in position beneath the float member and independent thereof and serving to prevent all dust and pipe scale from reaching the working parts of the stop and also the working parts of the meter. The filter may also be utilized to remove hydrogen sulphide from the gas stream and thus prevent corrosion of the working parts of the meter and contamination of the mercury therein. The filter as already noted is removable conveniently and may be replaced at intervals or whenever in use it becomes saturated.

These and other features of the invention will be best understood and appreciated from a following description of a preferred embodiment thereof selected for purposes of illustration and shown in the accompanying drawing, in which—

Fig. 1 is a view in longitudinal cross section of my automatic stop equipped with one form of filter, Fig. 2 is a diagrammatic view showing a typical installation of automatic stops of my invention in a gas line and their relation to the meter, and Fig. 3 is a view partly in elevation and partly in section of an alternative form of the filter.

I have shown in Fig. 2 a short section of pipe 1 in a flow line carrying gas, the flow of which it is desired to measure. The pipe 1 is provided with flanges 2 and 3 between which is secured a diaphragm 4. The diaphragm is provided at its center with an orifice of predetermined diameter which is effective to create a difference in pressure between its up-stream and down-stream sides. A small pipe 5 constitutes a connection leading from the flange 2 at the up-stream side of the diaphragm, assuming the gas flow to be from right to left, and in this pipe is located one of the automatic stops or traps 6 of my invention. Above the stop 6 is a further tubular connection 7 leading to the meter 8 which may be in this case an orifice meter of any commercial construction. From the meter 8 extends downwardly the tubular connection 9 and this is connected to a second automatic stop 6 which in turn is connected through the vertical pipe 10 to the flange 3 on the down-stream side of the diaphragm. It will be understood that this is a typical and conventional piping diagram for an orifice meter and is not part of my invention, merely showing where the automatic stops are to be located in the system.

Referring now to Fig. 1 it will be seen that the outer casing comprises a length of standard steam pipe, 1½" diameter, for example, having pipe threads cut at both ends and being internally threaded at its upper end. The casing is completed by an outlet cap fitting 12 internally threaded and screwed upon the upper end of the pipe section 6, and an inlet cap fitting 13 internally threaded and screwed upon the lower end of the section 6. The cap 12 is tapped with a pipe thread, and in this installation receives the outlet pipe 7. The cap 13 is also tapped with a pipe thread, and in this installation receives the upper end of the inlet pipe 5, which it will be noted terminates flush within the flange of the fitting and does not extend into the chamber therein or above its base.

Threaded into the upper end of the pipe section 6 is a plug 14 shouldered at its lower end and provided with a longitudinal bore 15 which serves both as a duct and guide passage. The passage 15 is counter-bored at its lower end to provide a circular bevelled valve seat 16. Concentrically disposed within the pipe section 6 is a long tubular float 17 having within its lower end a diaphragm 18 which closes the body of the float and provides an open chamber or receptacle in the lower end of the float. At its upper end the float is closed and provided with a tubular guide stem 19 having a cross pin 20 at its upper end which prevents the stem from being withdrawn from the plug when once assembled in the complete device. The stem is long enough to permit a substantial vertical movement of the float 17 within the casing and to maintain it at all times in substantial concentric relation to the casing with its walls spaced from the inner wall of the casing. About its lower end the stem 19 is provided with an annular bevelled valve ring 21 shaped to cooperate with the valve seat 16. Above the valve ring 21 is provided a transverse hole 22 through the stem. This communicates with the tubular passage of the stem so that when the float is in its lower position as shown in Fig. 1, gas is free to flow in through the hole 22, and up through the tubular stem 19. However, when the float is raised, the valve ring 21 meets the valve seat 16, closing all communication through the bore 15 between the float chamber and the outlet end of the automatic stop. As herein shown the diaphragm 18 is located so as to enclose about three-quarters of the length of the float 17 as a closed float chamber and to form an open-ended chamber of about one-quarter the length of the float in its lower end.

To the lower end of the pipe section 6 is soldered or otherwise secured a washer 23, and to this is attached a tubular filter comprising a metallic thimble 24 having upwardly extending U-shaped frame members attached thereto. The frame members 25 and the thimble 24 are surrounded by a thick felt sleeve 26 having a circular cover disk 27 of the same material united thereto. The filter is detachably secured in place by screws threaded into the washer 23 and may readily be removed for replacement by unscrewing the inlet cap 13 and removing these screws. A drain cock 28 is provided in the inlet cap 13 for draining the casing of the stop when desired.

The filter above described constitutes, in effect, a removable cartridge. This may be impregnated with any active agent for removing unwanted ingredients from the gas being handled. For example, it may be impregnated with iron oxide which will remove hydrogen sulphide from low-content gas, whereas, in handling a higher content gas, it will be desirable to use a cartridge filled with iron dust. A cartridge impregnated with oil is efficient in removing clay dust from the gas stream.

In Fig. 3 is shown an alternative form of filter cartridge comprising a metallic tubular body 30 merging into a thimble at its lower end and provided with upper and lower partitions 31 and 32 of wire gauze. The body of this cartridge may be filled with any desired filtering medium for the work in hand.

In operation, any liquid that may be carried in the gas flowing through the pipe 1, especially in considerable quantities, as in a gas line leading from a gas or oil well, tends to be driven up into the meter connections 5 and 10 and into the operating parts of the meter 8. This liquid would be injurious to the delicate mechanism of the meter or render it inaccurate by diluting the mercury contained in some types of meters. The automatic stop of my invention prevents the entrance of liquid into the connections 7 and 9 leading to the meter. If fluid in suspension, or carried with the gas should enter the pipe 5 with considerable velocity it will impinge upon the diaphragm 18 of the float member, and cause an instant lifting of the float and closing of the valve ring 21 upon the valve seat 16, thus preventing the passage of free liquid or gas momentarily past the valve seat through the connection 7 to the meter. If the flow of fluid into the connection 5 is gradual, it fills the lower end of the chamber within the casing 6 and when its level is sufficiently high the float 17 lifts until the valve closes, thus shutting off any further flow of liquid and preventing it from passing upwardly into the meter connections. When the fluid carried by the gas stream has passed through the orifice of the diaphragm 4 or passed the connections 5 and 10 the fluid in the lower part of the casing flows back through the connections 5 and 10 to the line 1, without having passed into the meter connection. When this happens the valve automatically opens and thereupon the meter or other instrument is again operatively connected to the pipe line in condition for carrying out its function.

The valve disclosed herein need not be located directly in the casing 6, but in any position to protect the meter. For example, it may be installed in the top of the two mercury chambers of any commercial meter to keep the meter from blowing or losing mercury. When so used the float may be reduced in size and will float upon the mercury in the meter rather than upon the oil in the casing 6.

It will be apparent that the automatic stop of my invention is not only valuable in the specific instance described but also in numerous other fields where it is desirable to keep liquids from flowing into connections where gas or gas pressure alone are desired.

Having thus disclosed my invention and described an illustrative embodiment thereof, I claim as new and desire to secure by Letters Patent:

In an automatic stop for pipe lines, the combination with an outer pipe-section casing having a plug therein bored to provide a long vertical guide passage, of a hollow cylindrical float having a rigid coaxial hollow stem projecting from its upper end and arranged, by movement in said passage, to guide the float in said casing, an internal wall disposed within the lower end of the float and so located as to provide an upper closed chamber within the float and an open ended chamber at its lower end, a concentric valve seat surrounding said stem upon the upper end of the float, the stem having a side opening adjacent to the valve seat permitting gas to flow into and through the hollow stem while the valve is open, and means carried by the stem for normally preventing its withdrawal from said passage.

GLEN L. SLOCUM.